(12) United States Patent
Ostling et al.

(10) Patent No.: US 11,273,786 B2
(45) Date of Patent: Mar. 15, 2022

(54) MOTOR VEHICLE AND AIRBAG MODULE

(71) Applicant: Autoliv Development AB, Vargarda (SE)

(72) Inventors: Martin Ostling, Brämhult (SE); Christer Lundgren, Vargarda (SE)

(73) Assignee: Autoliv Development AB, Vargarda (SE)

( * ) Notice: Subject to any disclaimer, the term of this patent is extended or adjusted under 35 U.S.C. 154(b) by 74 days.

(21) Appl. No.: 16/628,819

(22) PCT Filed: Jul. 5, 2018

(86) PCT No.: PCT/EP2018/068182
§ 371 (c)(1),
(2) Date: Jan. 6, 2020

(87) PCT Pub. No.: WO2019/008074
PCT Pub. Date: Jan. 10, 2019

(65) Prior Publication Data
US 2020/0139923 A1 May 7, 2020

(30) Foreign Application Priority Data
Jul. 6, 2017 (DE) .......................... 102017115095.1

(51) Int. Cl.
*B60R 21/233* (2006.01)
*B60N 2/01* (2006.01)
(Continued)

(52) U.S. Cl.
CPC .............. *B60R 21/233* (2013.01); *B60N 2/01* (2013.01); *B60R 21/21* (2013.01); *B60R 21/214* (2013.01);
(Continued)

(58) Field of Classification Search
CPC ..... B60R 21/233; B60R 21/21; B60R 21/214; B60R 21/232; B60R 2021/23107;
(Continued)

(56) References Cited

U.S. PATENT DOCUMENTS 8,414,017 B2 * 4/2013 Lee ........................ B60R 21/231
280/730.1
9,994,182 B1 * 6/2018 Jaradi ................... B60R 21/232
(Continued)

FOREIGN PATENT DOCUMENTS

DE 10111380 A1 10/2002
DE 10256024 A1 * 6/2004 ........... B60R 21/231
(Continued)

OTHER PUBLICATIONS

R. Leibelt, WO 2008/095615, Machine English Translation, ip.com (Year: 2008).*
(Continued)

*Primary Examiner* — Karen Beck
(74) *Attorney, Agent, or Firm* — Stoel Rives LLP

(57) ABSTRACT

A motor vehicle with at least one first seat (10) and at least one second seat (12) is described. The second seat (12) is located rear of the first seat (10) and the first seat has one position of operation in which it faces the second seat (12). An air-bag module with an inflatable airbag device (20) being positioned between the first seat (10) and the second seat (12) when in its fully deployed state is provided. Said inflatable airbag device (20) has a first impact surface (22) pointing towards the first seat (10), a second impact surface (24) pointing towards the sec- and seat (12), a main support surface (26) adjacent to or abutting a structural element of the vehicle, and a connecting surface (28) remote from the support surface (26) and extending between the impact surfaces (22, 24). Especially in order to improve the deploy-
(Continued)

Figure 1:
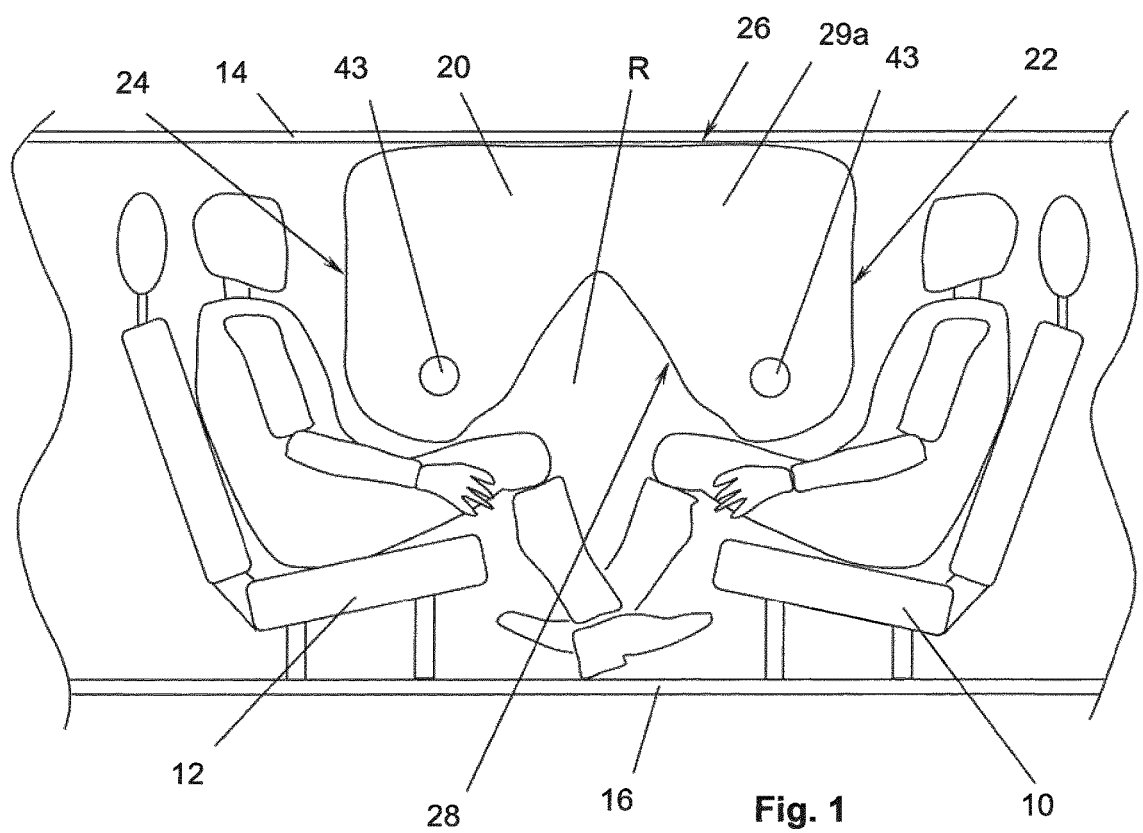

ment behaviour, the connecting surface (28) is at least partially concave, such that a recess (R) is formed.

35 Claims, 8 Drawing Sheets

(51) Int. Cl.
*B60R 21/214* (2011.01)
*B60R 21/231* (2011.01)
*B60R 21/232* (2011.01)
*B60R 21/21* (2011.01)

(52) U.S. Cl.
CPC ... *B60R 21/232* (2013.01); *B60R 2021/23107* (2013.01); *B60R 2021/23161* (2013.01); *B60R 2021/23324* (2013.01)

(58) Field of Classification Search
CPC .......... B60R 2021/23161; B60R 2021/23324; B60R 21/231; B60N 2/01
See application file for complete search history.

(56) References Cited

U.S. PATENT DOCUMENTS

| | | | | |
|---|---|---|---|---|
| 10,407,018 B2* | 9/2019 | Sundararajan | ...... | B60R 21/2338 |
| 10,471,923 B2* | 11/2019 | Jimenez | .............. | B60R 21/2338 |
| 10,688,955 B2* | 6/2020 | Shin | .................. | B60R 21/01512 |
| 10,906,496 B2* | 2/2021 | Baccouche | ......... | B60R 21/2342 |
| 10,960,844 B2* | 3/2021 | Jimenez | ................. | B60R 21/214 |
| 10,974,685 B2* | 4/2021 | Kwon | ................... | B60R 21/233 |
| 2005/0029781 A1* | 2/2005 | Enders | ................. | B60R 21/205 |
| | | | | 280/732 |
| 2005/0110247 A1* | 5/2005 | Suzuki | .................. | B60R 21/205 |
| | | | | 280/728.3 |
| 2012/0032426 A1* | 2/2012 | Tanaka | ................ | B60R 21/2334 |
| | | | | 280/730.2 |
| 2013/0069348 A1* | 3/2013 | Choi | ..................... | B60R 21/232 |
| | | | | 280/730.2 |
| 2017/0225788 A1* | 8/2017 | Humbert | .......... | B64D 11/06205 |
| 2018/0065581 A1* | 3/2018 | Ohno | .................... | B60R 21/231 |
| 2018/0215338 A1* | 8/2018 | Faruque | ................ | B60R 21/214 |
| 2018/0222432 A1* | 8/2018 | Schneider | ............. | B60R 21/261 |
| 2019/0061668 A1* | 2/2019 | Zhang | ................. | B60R 21/2338 |
| 2019/0193665 A1* | 6/2019 | Jimenez | .............. | B60R 21/2338 |
| 2019/0193666 A1* | 6/2019 | Jost | ..................... | B60R 21/2338 |
| 2019/0202391 A1* | 7/2019 | Cho | ...................... | B60R 21/233 |
| 2019/0202394 A1* | 7/2019 | Obayashi | .............. | B60R 21/213 |
| 2019/0217804 A1* | 7/2019 | Cho | ..................... | B60R 21/214 |
| 2019/0241148 A1* | 8/2019 | Shin | .................... | B60R 21/2338 |
| 2019/0375363 A1* | 12/2019 | Abe | ..................... | B60R 21/214 |
| 2019/0381968 A1* | 12/2019 | Kwon | .................. | B60R 21/013 |
| 2020/0017058 A1* | 1/2020 | Jaradi | .................. | B60R 21/233 |
| 2020/0017059 A1* | 1/2020 | Choi | ................. | B60R 21/23138 |
| 2020/0055479 A1* | 2/2020 | Seyffert | ................ | B60R 21/231 |
| 2020/0086820 A1* | 3/2020 | Gould | .................. | B60R 21/232 |
| 2020/0139923 A1* | 5/2020 | Ostling | .................. | B60R 21/21 |
| 2020/0307495 A1* | 10/2020 | Jimenez | ................ | B60R 21/232 |
| 2020/0307496 A1* | 10/2020 | Jimenez | ................ | B60R 21/231 |
| 2020/0361410 A1* | 11/2020 | Jayakar | ............ | B60R 21/1554 |
| 2020/0384940 A1* | 12/2020 | Sekizuka | ............. | B60R 21/237 |
| 2020/0406852 A1* | 12/2020 | Fischer | ................... | B60R 21/26 |
| 2021/0009072 A1* | 1/2021 | Hwangbo | ............. | B60R 21/214 |
| 2021/0016681 A1* | 1/2021 | Tippy | .................... | B60R 16/027 |
| 2021/0031718 A1* | 2/2021 | Schultz | ................. | B60R 21/231 |
| 2021/0101557 A1* | 4/2021 | Malapati | ............... | B60R 21/232 |
| 2021/0101559 A1* | 4/2021 | Fischer | ................. | B60R 21/232 |
| 2021/0129786 A1* | 5/2021 | Barnes | .................. | B60R 21/235 |

FOREIGN PATENT DOCUMENTS

| | | | | |
|---|---|---|---|---|
| DE | 102007061206 A1 | | 6/2009 | |
| FR | 2931421 A1 | | 11/2009 | |
| JP | 2011116153 A | * | 6/2011 | |
| WO | WO-2008095615 A1 | * | 8/2008 | .......... B60R 21/231 |
| WO | WO-2014016432 A1 | * | 1/2014 | .......... B60R 21/214 |

OTHER PUBLICATIONS

International Search Report of the International Searching Authority for PCT/EP2018/068182 dated Sep. 11, 2018.

* cited by examiner

MOTOR VEHICLE AND AIRBAG MODULE

The invention relates to a motor vehicle according to claim 1 and to an airbag module adapted to be installed into a motor vehicle in order to form such a motor vehicle according to claim 19.

Frontal airbags were the first kind of airbags introduced into the automotive technology. They are still a key feature of any safety concept of a passenger car. Presently such frontal airbags are most often installed either into the steering wheel (driver airbag) or into the in instrument panel (passenger airbag) and serve for the protection of the front-seated persons.

Also other types of frontal airbags have been proposed. For example from US 2016/0311393 A1 a roof-mounted frontal airbag is known.

Generic U.S. Pat. No. 9,096,150 B2 discusses aspects of autonomously driving cars. Inter alia it is suggested to design the front seats—in the following referred to as the first seats—in such a way that in one position of the seats the persons being seated in the front seats look to the rear of the vehicle such that he/she sits vis-à-vis the rear seated passengers sitting in the rear seats (second seats). It is briefly suggested to provide an airbag module which is positioned between the front seats and the rear seats such that its deployed inflatable airbag device is positioned between the front- and the rear-seated persons such that it can protect the front-seated passengers as well as the rear-seated passengers.

Starting from this it is the task of the invention to provide improvements of the concept mentioned in generic U.S. Pat. No. 9,096,150 B2.

This task is solved by a motor vehicle with the features of claim 1. An airbag module adapted for being installed into such a motor vehicle is defined in claim 19.

When in its fully deployed state the inflatable airbag device has a first impact surface pointing towards the first seat, a second impact surface pointing towards the second seat, a main support surface extending between the first and the second impact surface and being adjacent to or abutting a structural element of the vehicle, and a connecting surface remote of the support surface and extending between the impact surfaces. In order to protect both, a rear-seated person in case of a frontal crash and a front-seated person in case of a rear crash, the overall dimensions of the inflatable airbag device must me relatively large. So, without additional measures a very large volume has to be filled, which leads to problems in view of the deployment behaviour. It turned out that the volume enclosed by the inflatable airbag device can be reduced by shaping the connecting surface at least partially concave, such that a recess is formed, without limiting the restraining capability of the inflatable airbag device. The reason for that is that the main support surface being adjacent or abutting a structural element of the vehicle is relatively long in the longitudinal direction of the vehicle. Preferably the two impact surfaces basically extend parallel to each other. Usually that means that they are both vertically extending surfaces.

In many applications it is advantageous to provide the inflatable airbag device with a first gas space being allocated to the first impact surface and a second gas space being allocated to the second impact surface and with a first inflator in fluid communication with the first gas space and a second inflator in fluid communication with the second gas space, such that the two gas spaced are filled independently. This further improves the deployment behaviour and it is prevented that the inflatable airbag device is subjected to too high forces. It is especially preferred that the two inflators are triggered with a time-offset. It turned out that this leads to more defined and reproducible deployment behaviour.

In one embodiment each gas space is enclosed by a completely separate airbag, in another embodiment a joint airbag having a dividing wall is provided. In these cases the inflatable airbag device can be looked at as being comprised of a first part and a second part. As will be seen later, both concepts have advantages.

The airbag module can be mounted to the roof or to a side structure of the vehicle.

Further preferred embodiments are defined in the further sub-claims.

The invention will now be described in detail in view of preferred embodiments.

Figure 2:
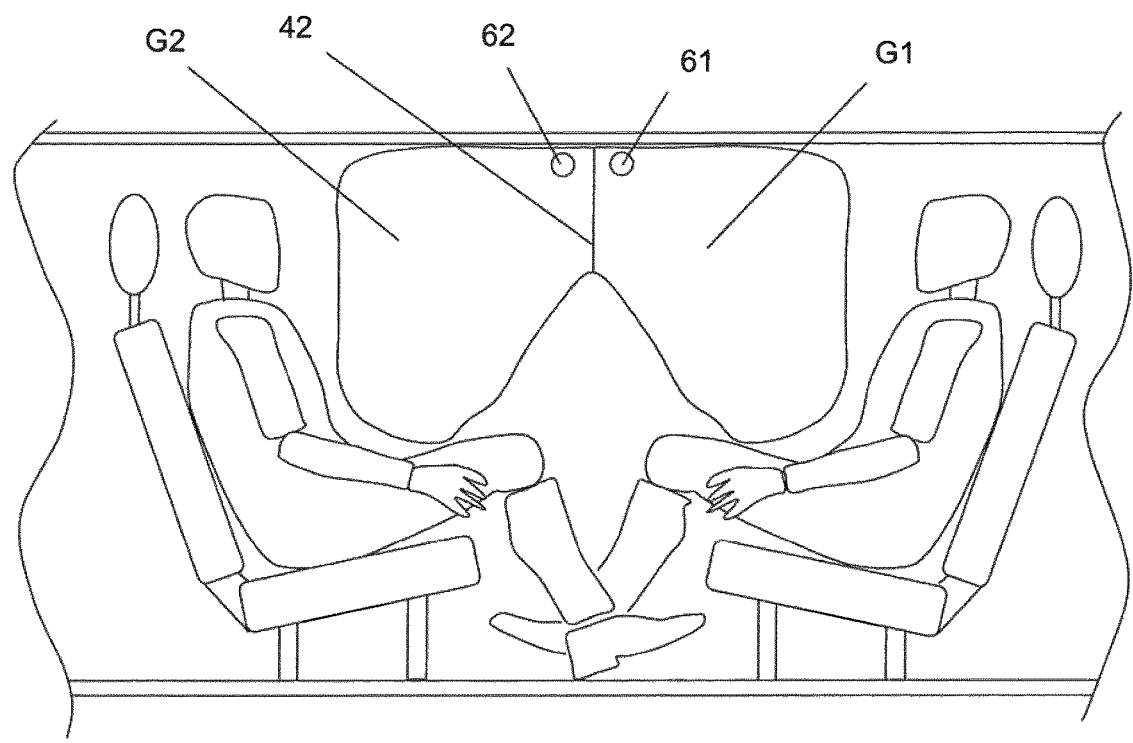
Figure 3:
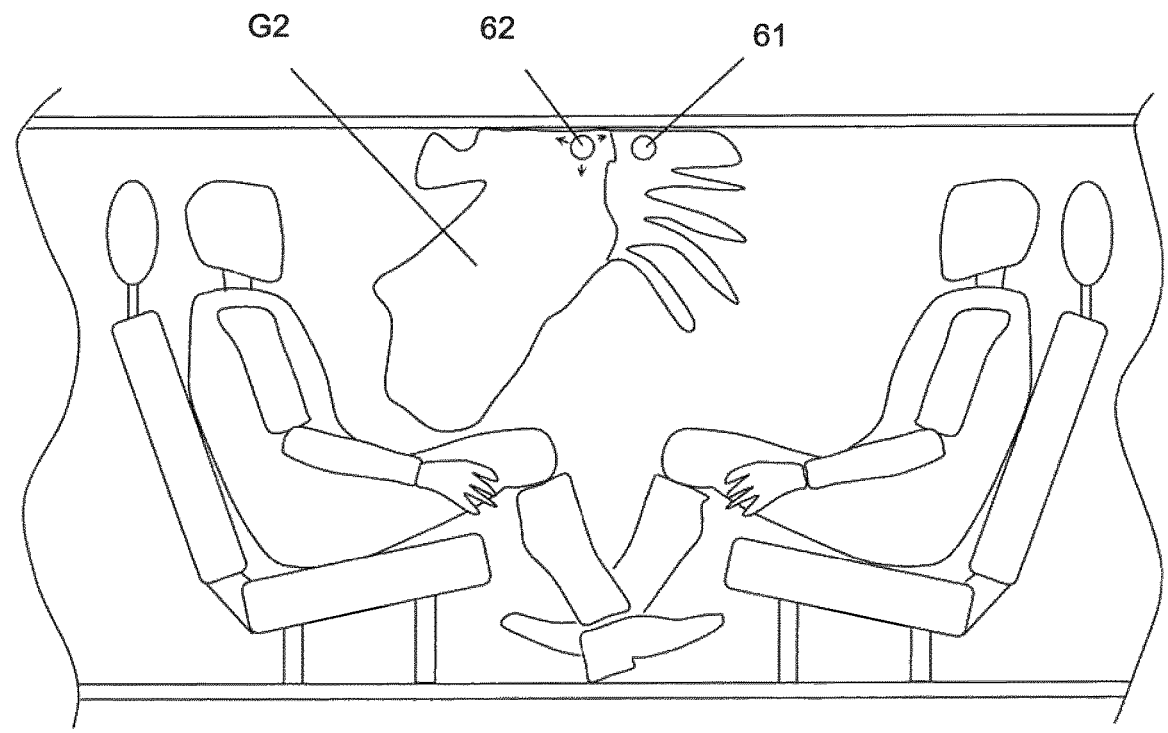
Figure 4:
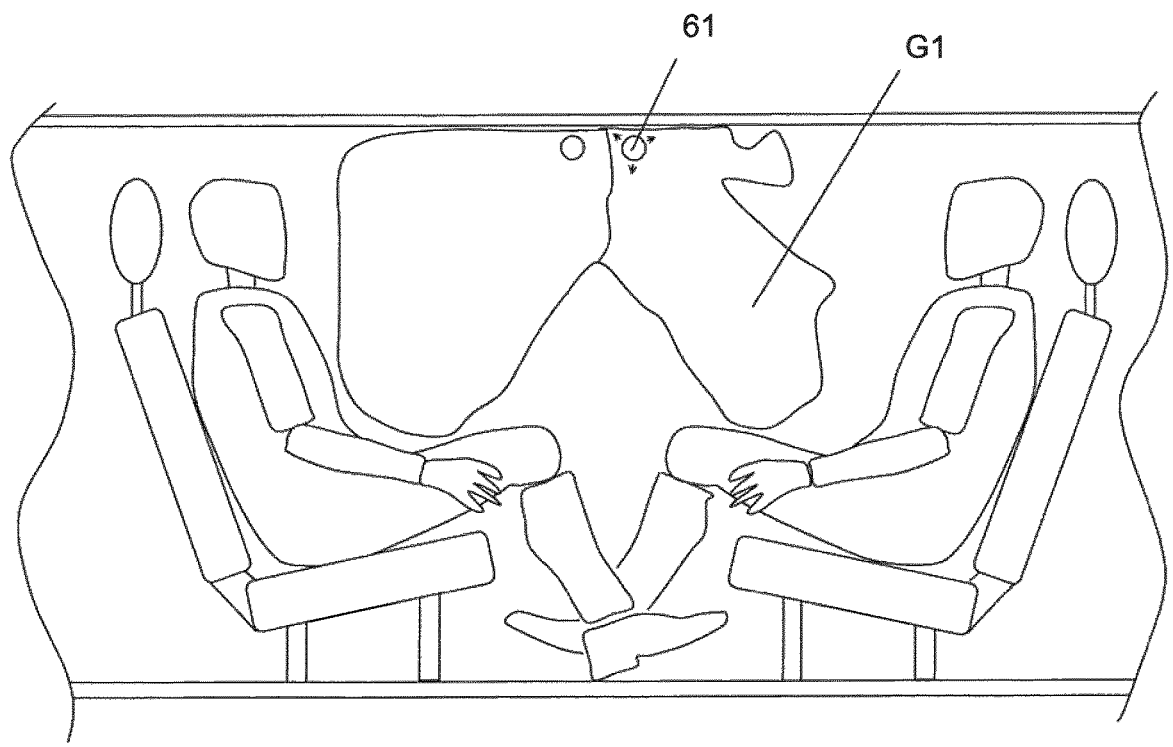
Figure 8:
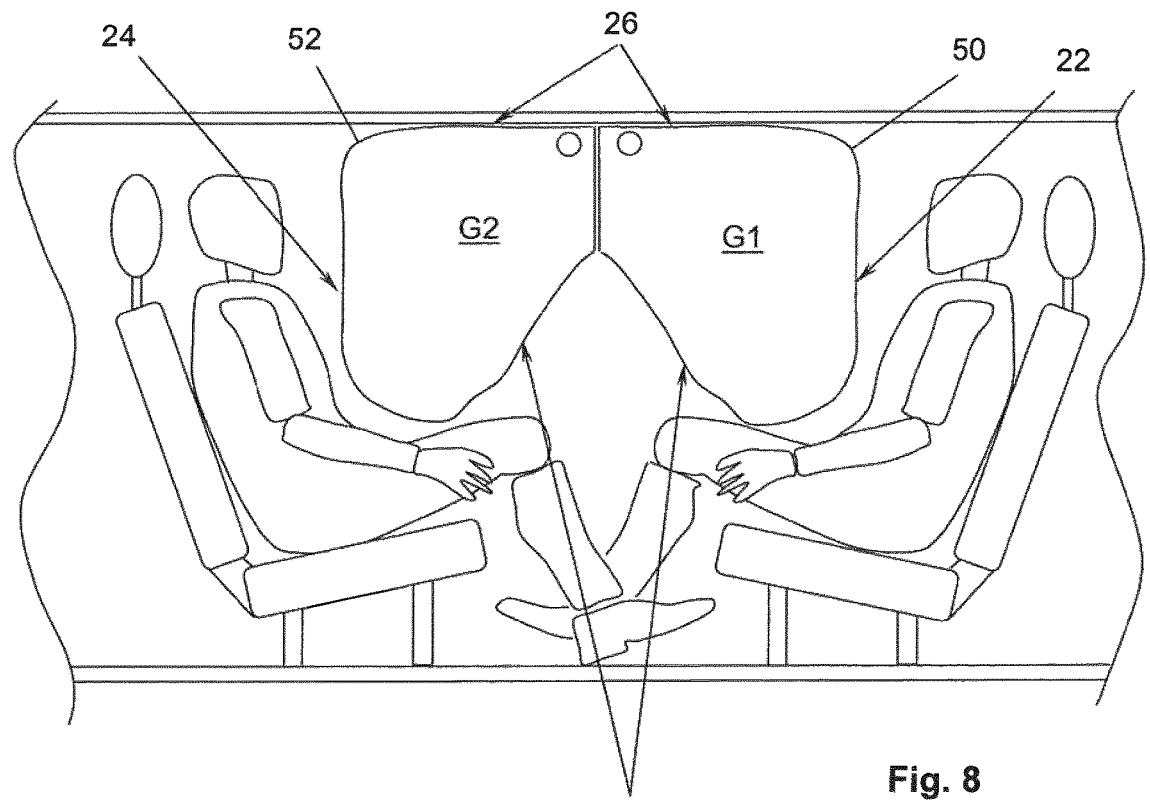
Figure 9:
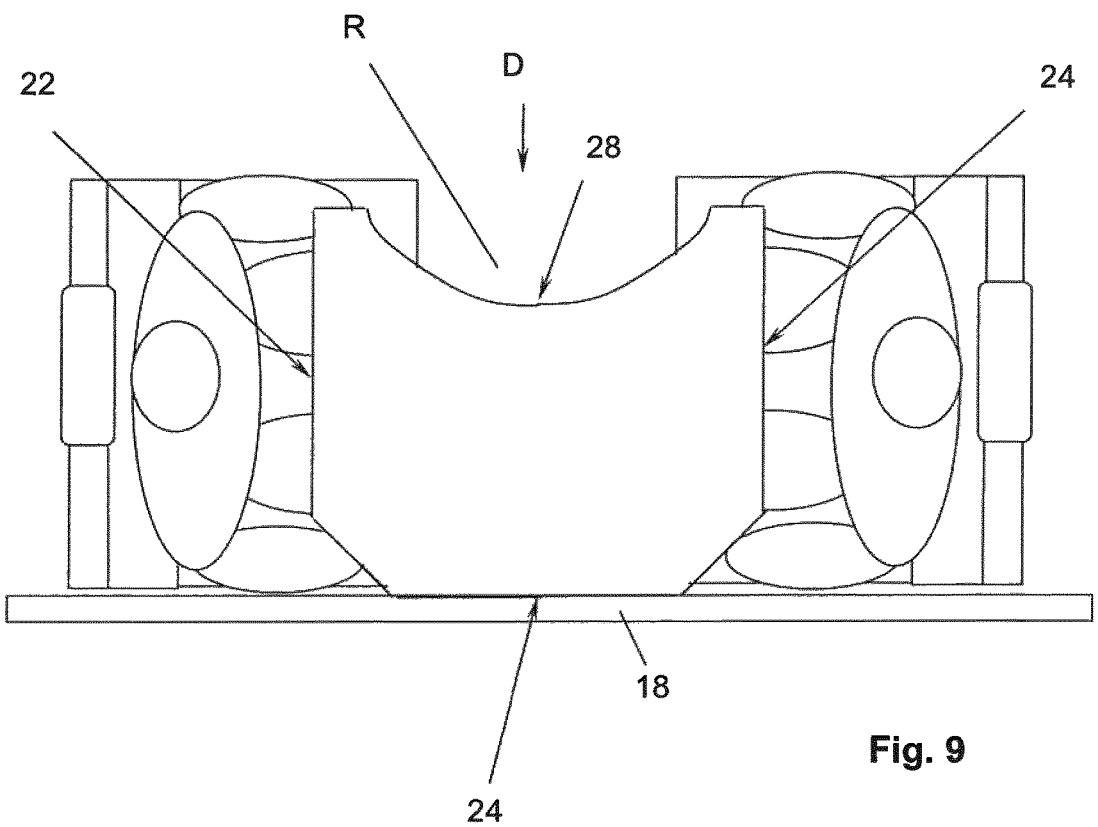
Figure 10:
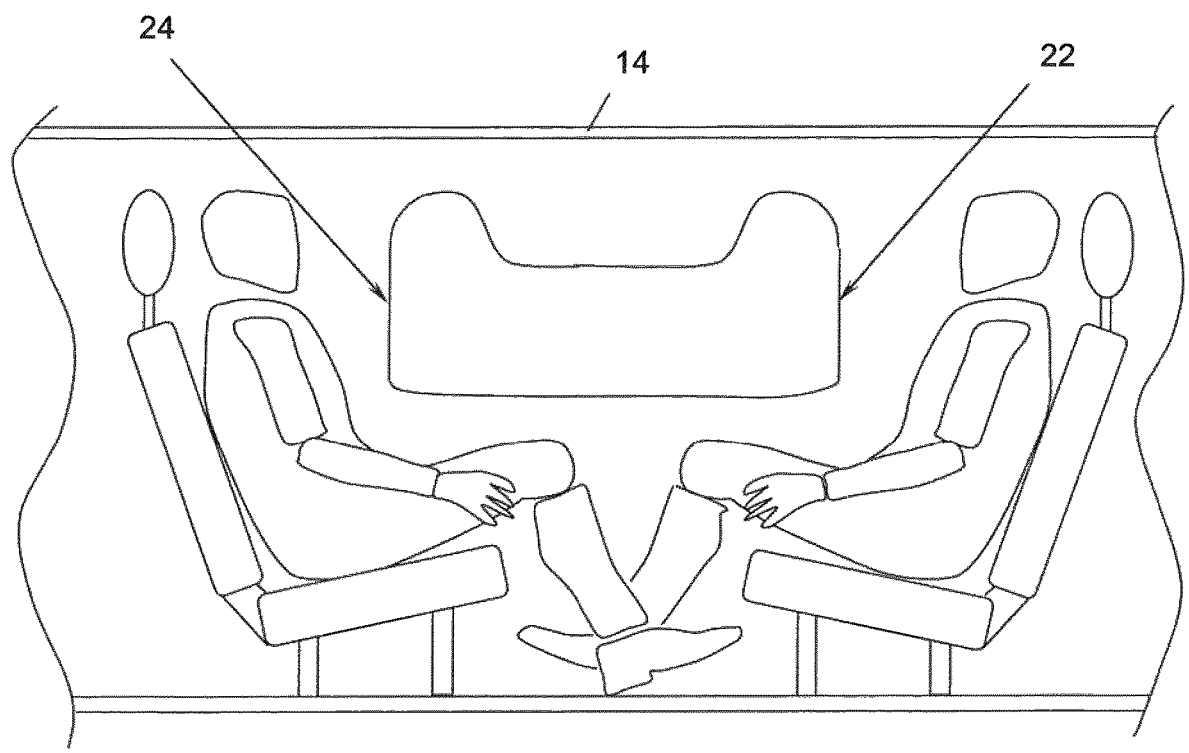
Figure 11:
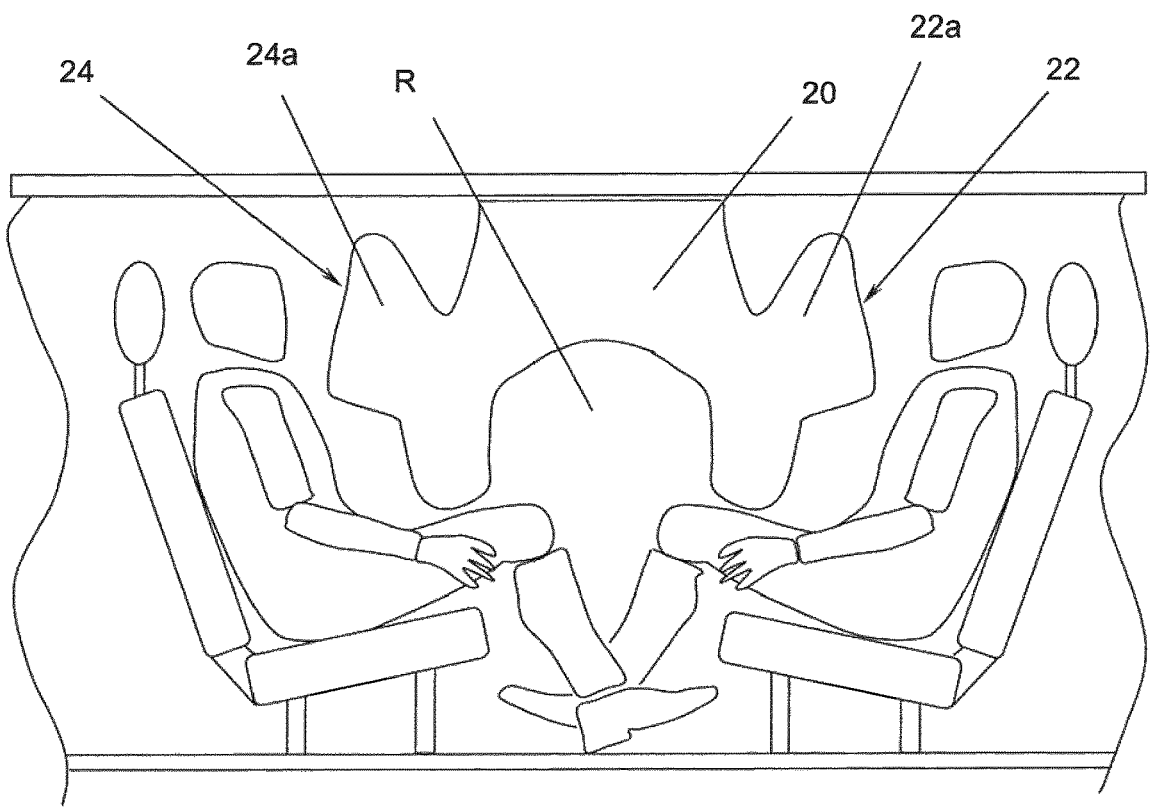
Figure 12:
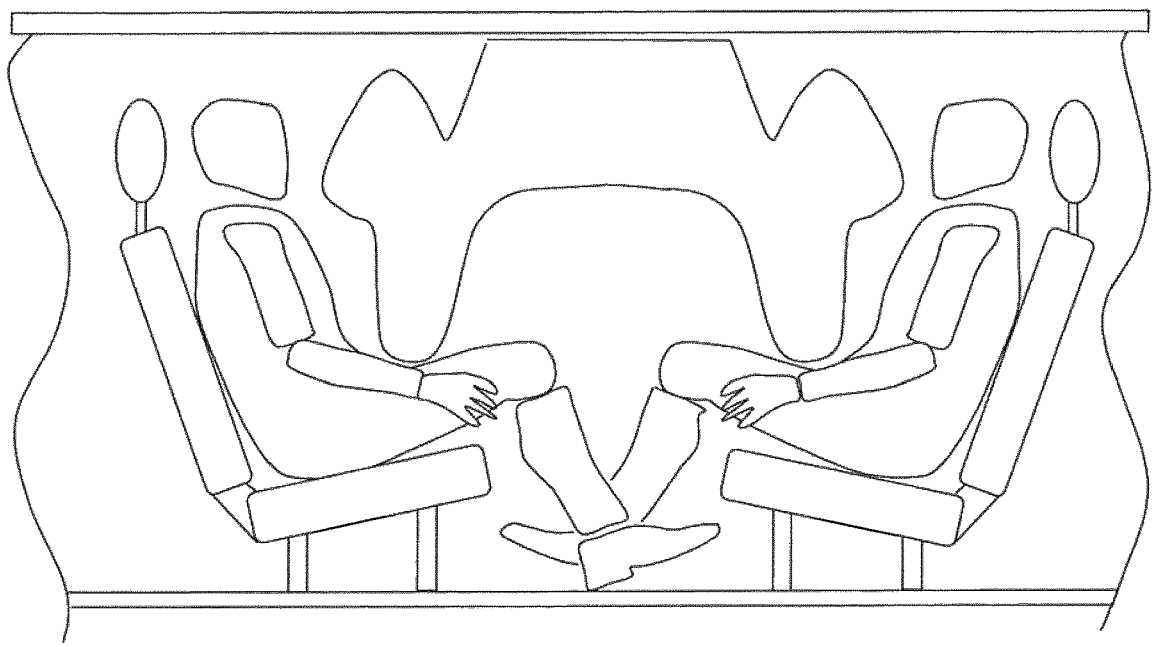
Figure 13:
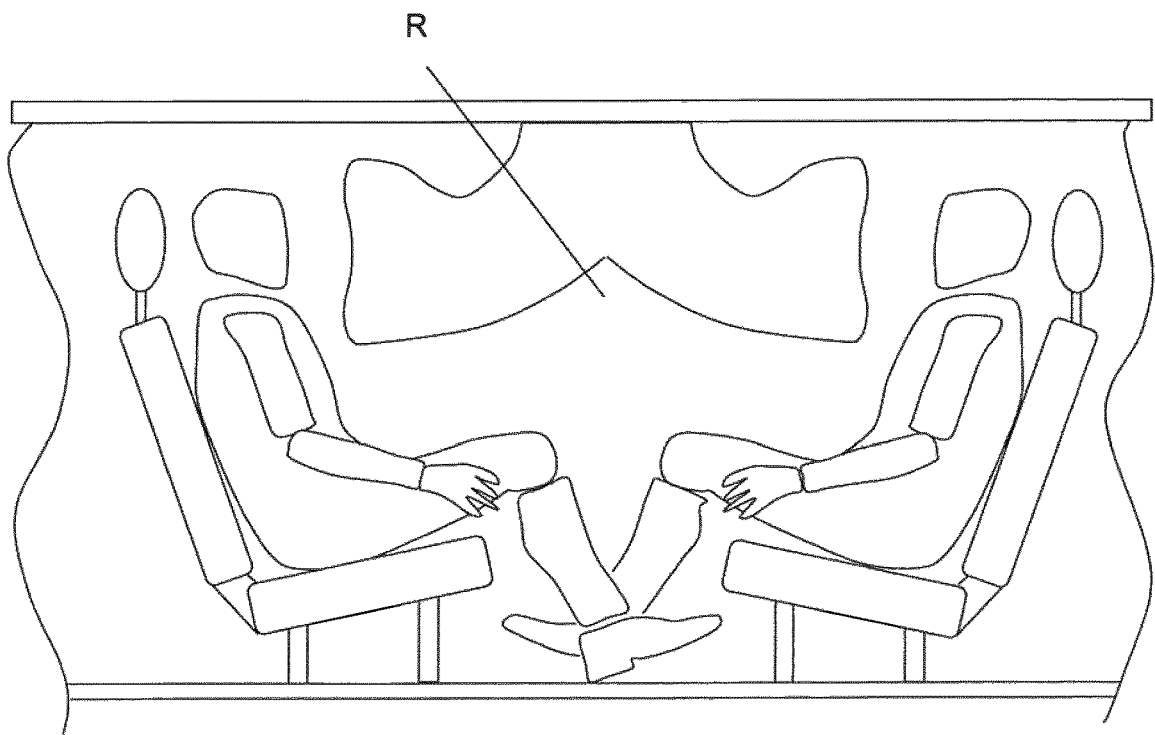

The Figures show:

FIG. 1 a schematic side elevation onto a part of the vehicle with an inventive inflatable airbag device being in its fully deployed state, FIG. 2 what is shown in FIG. 1 with the inflatable airbag device being shown in a sectional view, FIG. 3 what is shown in FIG. 2 during an early stage of deployment of the inflatable airbag device, FIG. 4 what is shown in FIG. 3 at a later stage, FIG. 5 a variation of the first embodiment when a rear seated person hits the second impact surface, FIG. 6 a second embodiment of the invention in a view according to FIG. 2, FIG. 7 a variation of the first embodiment shown in FIG. 2, FIG. 8 a third embodiment of the invention in a representation according to FIG. 2, FIG. 9 a fourth embodiment in a schematic top view, FIG. 10 what is shown in FIG. 9 in a side elevation from direction D in FIG. 9, FIG. 11 a fifth embodiment that is similar to the second embodiment of FIG. 6, FIG. 12 a slight variation to what is shown in FIG. 11, FIG. 13 a sixth embodiment in which the recess is relatively shallow, FIG. 14 a seventh embodiment, FIG. 15 a variation to the embodiment of FIG. 14, and FIG. 16 an eighth embodiment which is basically a mixture between the sixth and the eighth embodiment.

FIG. 1 shows a section of a motor vehicle in a schematic representation. This vehicle is equipped with at least two seats, namely a first seat 10 and a second seat 12 being located rear of the first seat 10 (in view of the normal driving direction of the motor vehicle). The second seat 12 points in a vehicle forward direction and the first seat 10 has at least one position (shown in the Figures) in which it faces the second seat 12 meaning that the person sitting in this first seat 10 is orientated against the driving direction of the vehicle. For example the first seat 10 could be the driver's seat in an autonomous driving vehicle in a position in which the "driver" is not driving. In another application first seat 10 and second seat 12 could be back seats in a larger car like a van or a bus. Both seats 10, 12 can be single seats or multiple person seats (benches).

As one can see from FIG. 1 an airbag module is attached to the roof 14 of the vehicle between the position of the first seat 10 and the position of the second seat 12. This airbag module comprises an inflatable airbag device 20 and at least one inflator. In the embodiment shown this at least one inflator is located inside the inflatable airbag device 20 so that it is not shown in FIG. 1, but in FIG. 2.

In the first embodiment the inflatable airbag device 20 shows a single airbag 40 having a first impact surface 22 pointing towards the head or to the head and to at least a part of the torso of a person seated in the first seat 10 and a second impact surface 24 pointing towards the head or to the head and at least a part of the thorax of a person seated in the second seat 12. The impact surfaces 22, 24 extend basically vertically and parallel to each other. This applies to all embodiments shown. This inflatable airbag device 20 further shows a main support surface 26 extending basically along the ceiling 14 of the vehicle and connecting the first ends—namely the upper ends—of the impact surfaces 22, 24. Remote of the main support surface 26 is a connecting surface 28 connecting second ends—namely the lower ends—of the impact surfaces 22, 24. The single airbag 40 is closed by two side panels. The outer surface 29a of one of the side panels is shown in FIG. 1. As one can also see from FIG. 1 ventilation holes 43 can be provided in at least one the side panels. The connecting surface 28 is partially concave, such that a recess R is formed. In the first embodiment the height of this recess R is relatively large, its extension in the vertical direction amounts to more than the half of the vertical extension of the impact surfaces 22, 24. So the silhouette of the completely deployed inflatable airbag devise is back-tooth-like.

In this first embodiment the inflatable airbag device 20 (meaning the single airbag 40) encloses two gas spaces G1 and G2. The first gas space G1 is allocated to the first impact surface 22 and the second gas space G2 is allocated to the second impact surface 24. The two gas spaces are divided by means of a dividing wall 42 (FIG. 2). A separate inflator is provided for each gas space G1, G2, namely the first inflator 61 for the first gas space G1 and a second inflator 62 for the second gas space G2. The gas spaces G1, G2 each define a volume between 80 and 120 litres, preferably of around 100 litres. Thus, the inflatable airbag device can be looked at as being comprised of two parts with the dividing wall belonging to both parts.

Now the deployment behaviour of the inflatable airbag device 20 of the first embodiment is described. In order to ensure reproducible deployment behaviour the two inflators 61, 62 are triggered with a time-offset. This time-offset is preferably between 10 and 30 milliseconds, especially 20 milliseconds. It is basically possible to trigger the first inflator 61 or to trigger the second inflator 62 first (as is shown in the embodiment). By triggering the two inflators 61, 62 with time-offset, one chamber is (at least partially) deployed before the other chamber so that during deployment the two parts of the inflatable airbag device 20 do not interfere with each other. The time delay and the deployment velocity should be such that both gas spaces G1 and G2 are completely filled with inflation gas before one of the occupants hits its allocated impact surface.

When the vehicle is involved in a frontal crash, the person seated in the second seat 12 moves in a vehicle forward direction and "falls" into the second impact surface 24 as is commonly known from frontal airbags. In this case the person seated in the first seat 10 is not at all affected by the inflatable airbag device 20. This person (for example the driver) is restrained by the back rest and the head rest of his/her seat. Despite the fact that the first impact surface 22 is not hit by its allocated person the area of the inflatable airbag device 20 enclosing the first gas space G1 (meaning the first part of the inflatable airbag device) is still relevant, since half of the main support surface 26 is an element of this first part of the inflatable airbag device. The same applies to the case of a "rear" crash (meaning another vehicle hitting the rear of this vehicle), but of course vice versa.

The fact that the connecting surface 26 is at least partially concave such that a recess is formed has the following advantages:

First of all, the volume to be filled with inflation gas is reduced. Further, a part of the connecting surface 28 can serve as an additional support surface, if it comes in contact to the thighs of the person to be restrained. Additionally, good deployment behaviour can be achieved by separating the two parts of the inflatable airbag device to a large extend. But it needs to be mentioned that a complete separation is not possible, since then the main support surface of the one part could not serve for supporting the other part of the inflatable airbag device.

Figure 5:
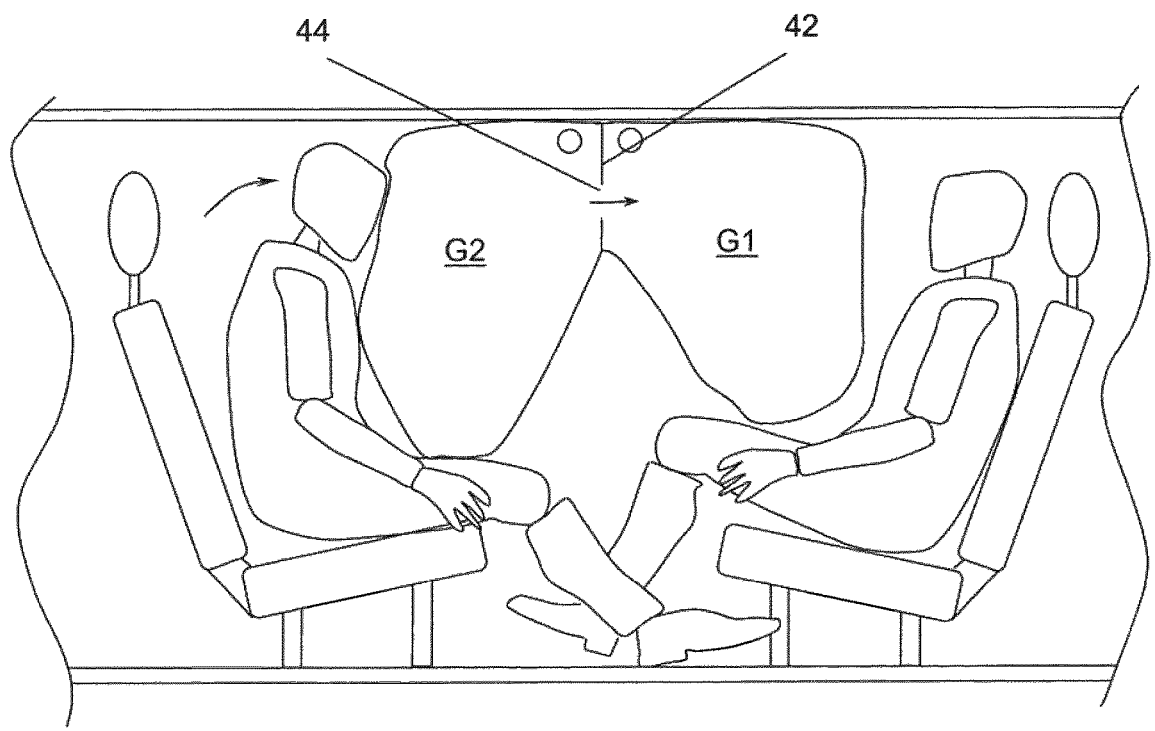

As is shown in FIG. 5 a vent 44 can be provided in the dividing wall 42. This vent can for example be a permanently open hole, an adaptive vent or an active vent. Often a simple hole will be sufficient and the advantage of the presence of a vent will now be described by view of example of a frontal crash:

When a frontal crash occurs, the second part of the inflatable airbag device serves for protecting the rear seated occupant. The task of the first part of the inflatable airbag device 20 is to provide a part (namely the most important part) of the main support surface 26. So it can have a positive effect if gas can flow form the second gas space G2 to the first gas space G1 leading to a softer second impact surface 24 and to more gas in the first gas space G1 making the first part of the inflatable airbag device pointing to the front of the airbag harder such that it can better support the second part (rear part) of the inflatable airbag device (FIG. 5).

Figure 6:
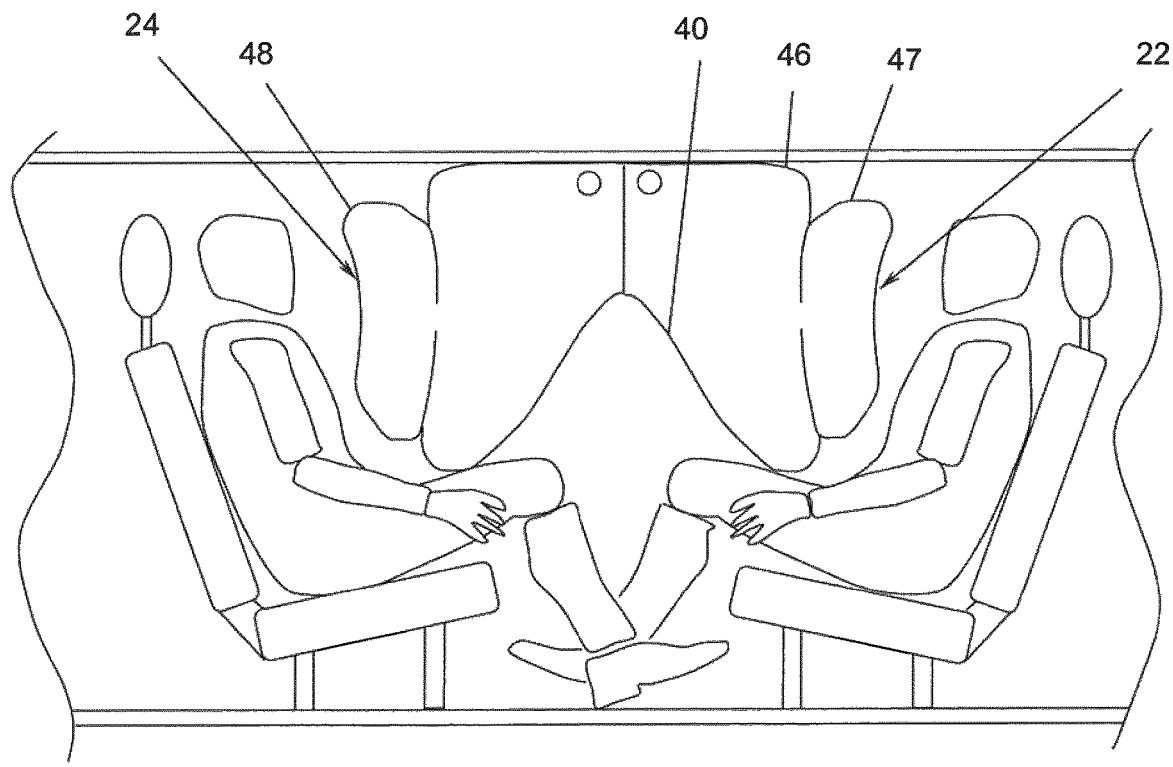

As can for example be seen from FIG. 6 the single airbag 40 can also be comprised of a main cushion 46 and two additional cushions 47 and 48. These additional cushions 47 and 48 each define a protruding section and form the complete or a part of the impact surfaces 22, 24. Because of the presence of the additional cushions 47, 48, the first gas space G1 is divided into a main chamber and an additional chamber and the second gas space is also divided into a main chamber and an additional chamber. The main chamber is connected with its additional chambers by means of at least one overflow opening each.

By providing additional cushions a "softer" restraining behaviour can be achieved.

Figure 7:
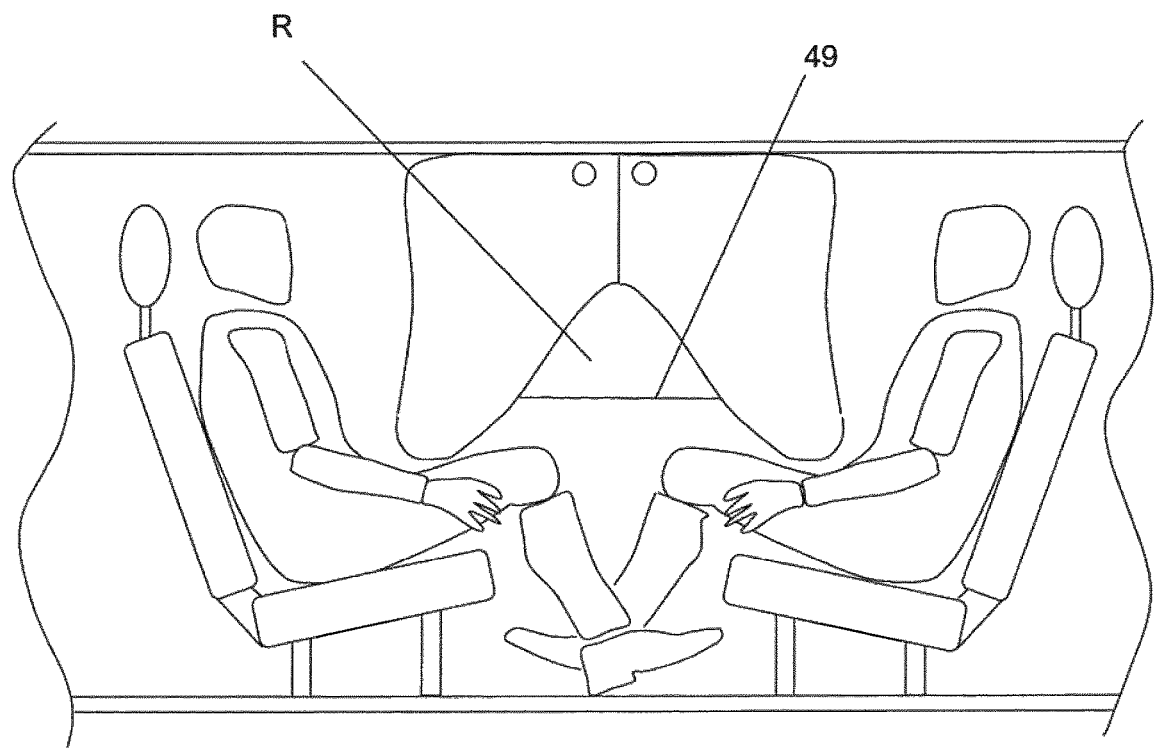

As can be seen from FIG. 7 a tether 49 can extend through the recess. Such a tether can help to position the inflatable airbag device 20 correctly when it is deployed.

FIG. 8 shows an embodiment of an invention in which the inflatable airbag device 20 is comprised of two separate airbags, namely the first airbag 50 and the second airbag 52. The basic layout and the deployment behaviour as well as the behaviour during the crash is basically the same as described in view of FIGS. 2 to 4, but the dividing wall is replaced by two separate walls. One advantage of having two separate airbags is that each airbag 50, 52 can be placed in a separate housing, if the available space makes this necessary. Although not shown in the Figures it would of course be possible to provide each the single airbags 50, 52 with an additional cushion as shown in FIG. 6.

FIGS. 9 and 10 show an embodiment which differs from the other embodiments in the mounting position of the airbag module. Here, the airbag module is mounted to a side structure 18 of the vehicle. Like in the embodiments just described, the connecting surface 28 is concave such that a recess R is formed. In the embodiment described the surface of the side panel facing the roof 14 is also partially concave such that a second recess is formed. By these two measures the volume enclosed by the inflatable airbag device can be reduced. As in the roof mounted embodiments two separate gas spaces with two separate inflators can be provided, but it is also possible to provide only a single gas space and a single inflator. Like in the above described embodiments the support is given by the main support surface.

In FIGS. 11 to 16 embodiments of roof-mounted inflatable airbag devices 20 are shown in a representation according to FIG. 1 (but without the ventilation holes which are usually also present in these embodiments being shown). It is to be mentioned that all these embodiments could have only one gas space or (which is usually preferred) two gas spaces. Further, all these embodiments could be comprised of a single airbag or of two airbags. Finally, a tether could be provided in all embodiments (not shown in the Figures).

The inflatable airbag device 20 of the fifth embodiment shown in FIGS. 11 and 12 has an outer shape similar to the inflatable airbag device shown in FIG. 6, meaning that the inflatable airbag device has a protruding section 22a, 24a basically in front of the heads of the occupants. But here, this shape is not generated by additional cushions but by means of the shape of the side panels. This has two advantages: First, it simplifies the manufacturing process, and second, it opens the possibility to generate almost every desired shape.

FIG. 13 also shows an embodiment in which the silhouette of the inflatable airbag device 20 is exclusively generated by the side panels. One can see that the inflatable airbag device does not protrude towards the thighs of the occupants such that the recess R is relatively shallow. Such a shape can be preferred if the overall geometry of the car and the possibility that a baby carrier is placed on one seat, makes this necessary.

Figure 14:
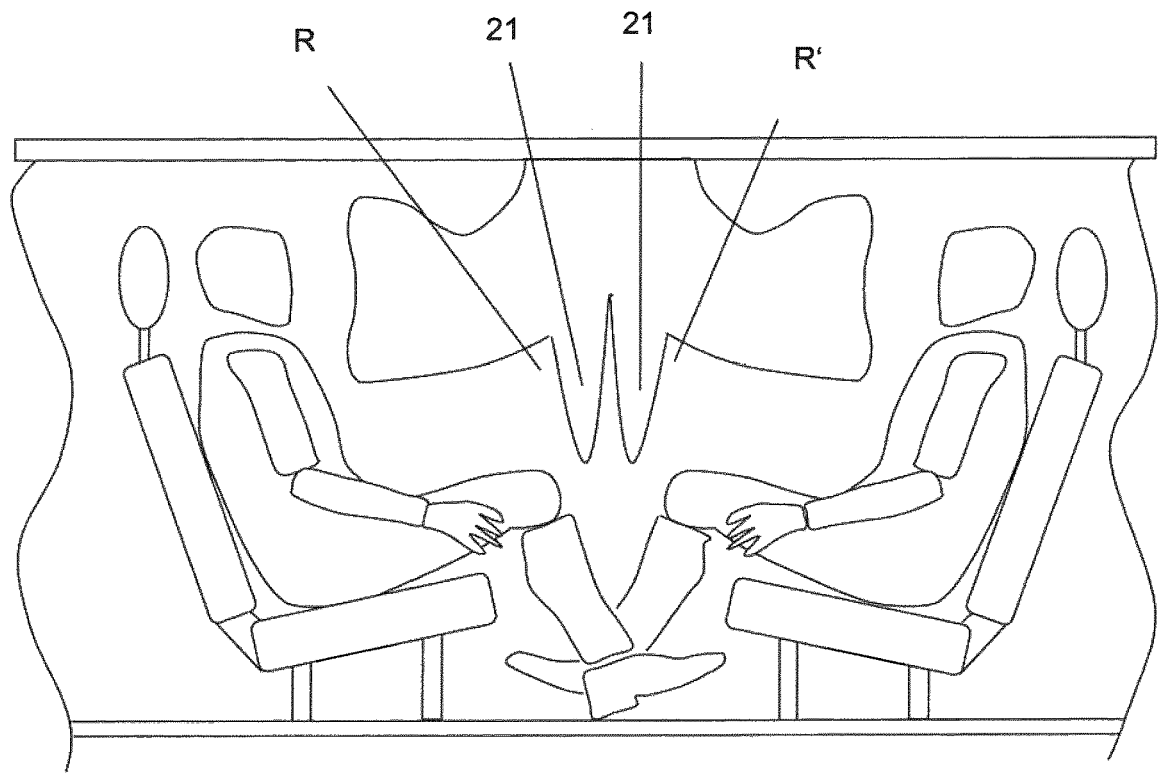
Figure 15:
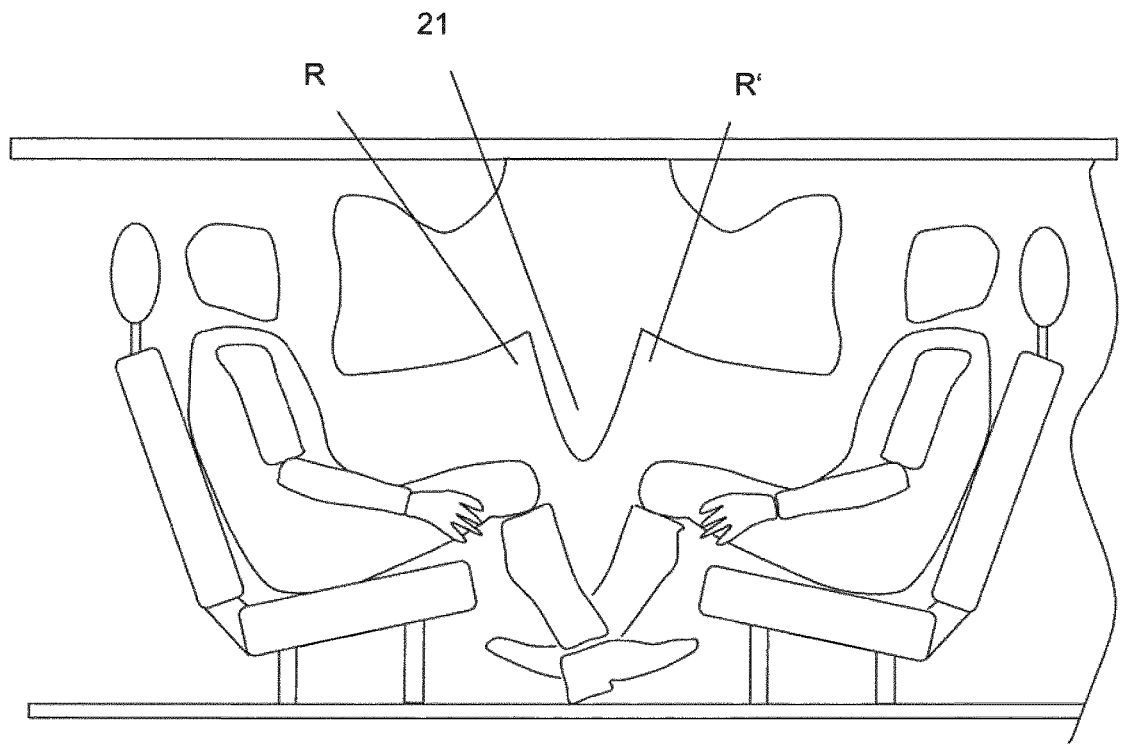

In FIG. 14 an embodiments is shown which is to some extend similar to the embodiment of FIG. 13, but here the inflatable airbag device shows at least one (in the example shown in FIG. 14 two) middle-extension 21 protruding towards the vehicle floor in a "stalactite fashion". So the shape of the connecting surface 28 is more complex: It has concave and convex sections. Consequently the recess has at least two sections (or one could also say that the inflatable airbag device has at least two recesses). The advantage of providing such a middle-extension is, that it can help to protect the occupants from lose objects like laptops and the like that tend to fly around in the passenger compartment in case of an accident. FIG. 15 shows a variation of the embodiment of FIG. 15. Here, only one middle-extension 21 is provided.

Figure 16:
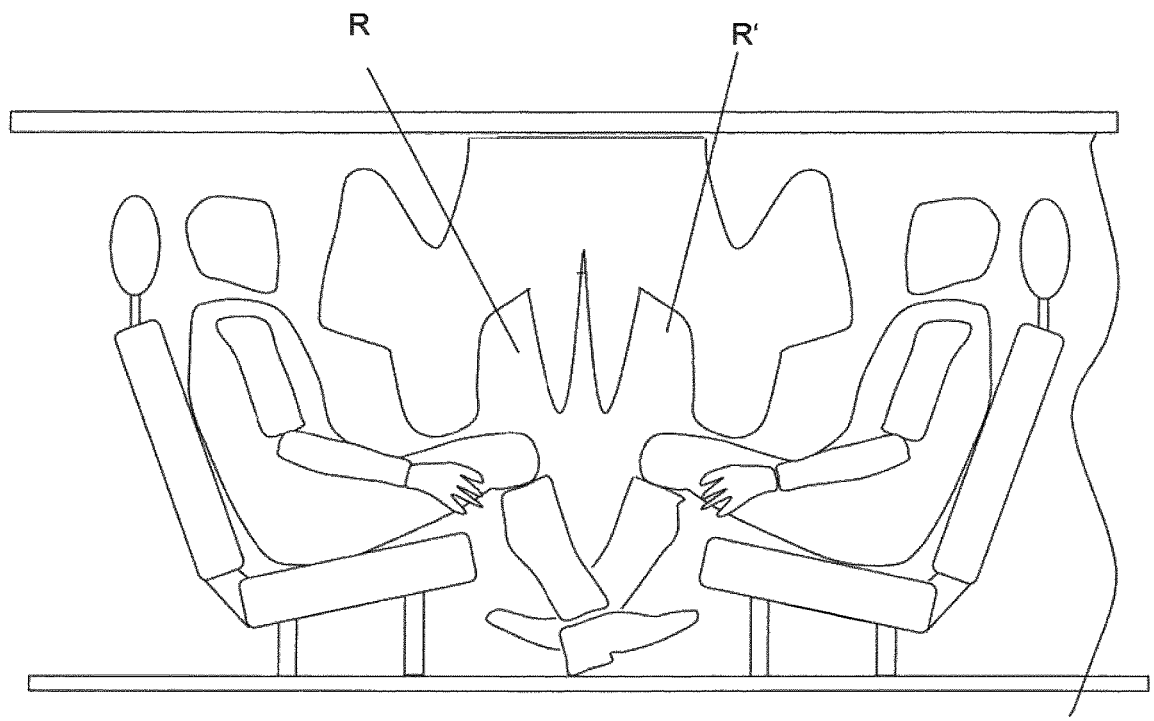

As can be seen from FIG. 16, the concept of providing a middle-extension can be combined with the concept of providing protruding sections 22a, 24a in front of the heads of the occupants.

LIST OF REFERENCE NUMBERS 10 first seat
12 second seat
14 roof
16 floor
18 side structure
20 inflatable airbag device
21 middle-extension
22 first impact surface
24 second impact surface
26 main support surface
28 connecting surface
29 lateral surface
30 first gas space
32 second gas space
40 single airbag
42 dividing wall
43 ventilation hole
44 vent
46 main cushion
47 first additional cushion
48 second additional cushion
49 tether
50 first airbag
52 second airbag
61 first inflator
62 second inflator
R, R' recess

The invention claimed is:

1. A motor vehicle comprising:
at least one first seat and at least one second seat, said second seat being located rear of the first seat, said first seat having a position of operation in which it faces the second seat,
an airbag module with an inflatable airbag device being positioned between the first seat and the second seat when in its fully deployed state, said inflatable airbag device having a first impact surface pointing towards the first seat, a second impact surface pointing towards the second seat, a main support surface adjacent to or abutting a structural element of the vehicle, and a connecting surface remote from the support surface and extending between the impact surfaces,
wherein the connecting surface is at least partially concave, such that a recess is formed.

2. The motor vehicle of claim 1, wherein the airbag module is mounted to a roof of the vehicle.

3. The motor vehicle of claim 1, wherein the inflatable airbag device comprises a first protruding section which forms at least a part of the first impact surface and a second protruding section which forms at least a part of the second impact surface.

4. The motor vehicle of claim 1, wherein the inflatable airbag device has a first part enclosing a first gas space being allocated to the first impact surface and a second part enclosing a second gas space being allocated to the second impact surface and wherein the airbag module further comprises a first inflator in fluid communication with the first gas space and a second inflator in fluid communication with the second gas space.

5. The motor vehicle of claim 4, wherein the inflatable airbag device comprises two separate airbags, a first airbag forming the first part of the inflatable airbag device and a second airbag forming the second part of the inflatable airbag device.

6. The motor vehicle of claim 5, wherein
the first airbag comprises a first main cushion and a first additional cushion defining a first protruding section and thus forming at least a part of the first impact surface and
the second airbag comprises a second main cushion and a second additional cushion defining a second protruding section and thus forming at least a part of the second impact surface.

7. The motor vehicle of claim 4, wherein the inflatable airbag device comprises a single airbag having a dividing wall separating the first gas space from the second gas space.

8. The motor vehicle of claim 7, wherein a vent is provided in the dividing wall.

9. The motor vehicle of claim 8, wherein the vent is an active vent having an open state and a closed or throttled state.

10. The motor vehicle of claim 7, wherein the single airbag comprises a main cushion, a first additional cushion defining a first protruding section and thus forming at least a part of the first impact surface, and a second additional cushion defining a second protruding section and thus forming at least a part of the second impact surface.

11. The motor vehicle of claim 4, wherein the first inflator and the second inflator are triggered with a time-offset.

12. The motor vehicle of claim 11, wherein the time-offset is between 5 and 40 ms.

13. The motor vehicle of claim 2, wherein the depth of the recess is at least half the maximum distance between the main support surface and the connecting surface.

14. The motor vehicle of claim 2, wherein an external tether extends through the recess with both ends of the tether being connected to the connecting surface.

15. The motor vehicle of claim 2, wherein the inflatable airbag device encloses a volume between 160 and 240 litres.

16. The motor vehicle of claim 2, wherein the inflatable airbag device comprises at least one middle-extension protruding towards a vehicle floor.

17. The motor vehicle of claim 2, wherein the inflatable airbag device is mirror-symmetrical with a plane of symmetry extending between the impact surfaces.

18. An airbag module adapted for being installed into a motor vehicle to form the motor vehicle of claim 2.

19. The motor vehicle of claim 1, wherein the airbag module is mounted to a side structure of the vehicle.

20. The motor vehicle of claim 19, wherein the inflatable airbag device comprises a first protruding section which forms at least a part of the first impact surface and a second protruding section which forms at least a part of the second impact surface.

21. The motor vehicle of claim 19, wherein the inflatable airbag device has a first part enclosing a first gas space being allocated to the first impact surface and a second part enclosing a second gas space being allocated to the second impact surface and wherein the airbag module further comprises a first inflator in fluid communication with the first gas space and a second inflator in fluid communication with the second gas space.

22. The motor vehicle of claim 21, wherein the inflatable airbag device comprises two separate airbags, a first airbag forming the first part of the inflatable airbag device and a second airbag forming the second part of the inflatable airbag device.

23. The motor vehicle of claim 22, wherein
the first airbag comprises a first main cushion and a first additional cushion defining a first protruding section and thus forming at least a part of the first impact surface and
the second airbag comprises a second main cushion and a second additional cushion defining a second protruding section and thus forming at least a part of the second impact surface.

24. The motor vehicle of claim 21, wherein the inflatable airbag device comprises a single airbag having a dividing wall separating the first gas space from the second gas space.

25. The motor vehicle of claim 24, wherein a vent is provided in the dividing wall.

26. The motor vehicle of claim 25, wherein the vent is an active vent having an open state and a closed or throttled state.

27. The motor vehicle of claim 24, wherein the single airbag comprises a main cushion, a first additional cushion defining a first protruding section and thus forming at least a part of the first impact surface and a second additional cushion defining a second protruding section and thus forming at least a part of the second impact surface.

28. The motor vehicle of claim 21, wherein the first inflator and the second inflator are triggered with a time-offset.

29. The motor vehicle of claim 28, wherein the time-offset is between 5 and 40 ms.

30. The motor vehicle of claim 19, wherein the depth of the recess is at least half the maximum distance between the main support surface and the connecting surface.

31. The motor vehicle of claim 19, wherein an external tether extends through the recess with both ends of the tether being connected to the connecting surface.

32. The motor vehicle of claim 19, wherein the inflatable airbag device encloses a volume between 160 and 240 litres.

33. The motor vehicle of claim 19, wherein the inflatable airbag device is mirror-symmetrical with a plane of symmetry extending between the impact surfaces.

34. An airbag module adapted for being installed into a motor vehicle to form the motor vehicle of claim 19.

35. A motor vehicle comprising:
at least one first seat and at least one second seat, said second seat being located rear of the first seat, said first seat having a position of operation in which it faces the second seat, and
an airbag module with an inflatable airbag device being positioned between the first seat and the second seat when in its fully deployed state, said inflatable airbag device having a first impact surface pointing towards the first seat, a second impact surface pointing towards the second seat, a main support surface adjacent to or abutting a structural element of the vehicle, and a connecting surface remote from the support surface and extending between the impact surfaces,
wherein the connecting surface is at least partially concave, such that a recess is formed,
wherein the inflatable airbag device comprises a single airbag having a dividing wall separating a first gas space from a second gas space,
wherein the inflatable airbag device is mirror-symmetrical with a plane of symmetry extending between the impact surfaces, and
wherein the dividing wall is disposed along the plane of symmetry.

* * * * *